United States Patent [19]

Ohno et al.

[11] 4,340,646

[45] Jul. 20, 1982

[54] MULTI-LAYER REFLECTORS

[75] Inventors: Akira Ohno; Shitomi Katayama; Suguru Nomura; Susumu Senaha; Suizo Kyo; Susumu Shimomura; Akira Akagami; Hiroshi Imai, all of Yokohama, Japan

[73] Assignees: NHK Spring Co., Ltd.; Yokohama Kiko Co., Ltd., both of Kanagawa, Japan

[21] Appl. No.: 93,558

[22] Filed: Nov. 13, 1979

[30] Foreign Application Priority Data

Nov. 13, 1978 [JP] Japan .................................. 53/138903

[51] Int. Cl.³ ........................ G02B 5/08; B32B 17/10; B32B 15/08
[52] U.S. Cl. ...................................... 428/429; 350/288; 350/292; 350/320; 428/412; 428/415; 428/416; 428/425.5; 428/425.6; 428/425.8; 428/426; 428/427; 428/428; 428/432; 428/433; 428/434; 428/446; 428/447; 428/450; 428/458; 428/457; 428/463; 428/460; 428/469; 428/472; 428/913
[58] Field of Search ............... 428/429, 446, 469, 472, 428/432, 433, 434, 447, 913, 426, 412, 425.8, 425.6, 425.5, 415, 416, 458, 460, 463, 428, 427, 457, 450; 350/320, 288, 292; 427/124, 125, 295, 330

[56] References Cited

U.S. PATENT DOCUMENTS

| | | | |
|---|---|---|---|
| 2,519,722 | 8/1950 | Turner | 350/320 |
| 2,676,117 | 4/1954 | Colbert | 350/288 |
| 3,026,177 | 3/1962 | St. Pierre | 350/288 X |
| 3,026,210 | 3/1962 | Coble | 350/288 X |
| 3,398,040 | 8/1968 | Allen | 350/288 X |
| 3,410,636 | 11/1968 | Herrick | 350/288 |
| 3,610,741 | 10/1971 | Davies | 350/320 |
| 3,687,713 | 8/1972 | Adams | 350/288 |
| 3,837,895 | 9/1974 | Pyror | 428/429 |
| 4,009,947 | 3/1977 | Nisheda | 350/288 |

FOREIGN PATENT DOCUMENTS

| | | | |
|---|---|---|---|
| 653550 | 12/1962 | Canada | 428/429 |
| 618610 | 7/1978 | U.S.S.R. | 350/320 |

*Primary Examiner*—Ellis P. Robinson
*Attorney, Agent, or Firm*—Sughrue, Mion, Zinn, Macpeak & Seas

[57] ABSTRACT

The reflector of the present invention is a multi-layer reflector comprising a substrate with or without a resin layer coated thereon; a light-reflective metal layer vacuum-coated on said substrate; and a protective layer consisting of a light transmittable resin layer and a light transmittable, preferably vacuum-coated, inorganic substance layer coated on said metal layer. By this, each film can be thin as compared with each individual protective film, which leads to good heat conductivity low temperature rise, high impact strength and good durability and which gives clear reflected images or high precision light collective and light distributing properties. In addition, the coated light-reflective metal shows better regular reflectivity, giving clear and sharp reflected images and allowing more accurate light collective or light distributing properties. Furthermore, selection of an inorganic substance layer or a resin layer as the outermost protection allows the manufacture of reflectors having desired characteristics (resistance to oil, solvents, light, heat, abrasion, chemicals, water and moisture; flexibility, etc.) depending on specific requirements.

10 Claims, No Drawings

MULTI-LAYER REFLECTORS

DETAILED DESCRIPTION OF INVENTION

The present invention relates to reflectors suitable for use in lighting fixtures, such as an illumination shade optical instruments, sunlight, etc., which comprises a metallic or nonmetallic substrate with or without a resin layer coated thereon, a light-reflective metal layer and two protective layers coated on said metal layer.

Typical reflectors conventionally used may be classified into the following groups:

(1) The one in which the surface of metal such as stainless steel or aluminum is subjected to buff, electrolytic or chemical polishing, (2) The one in which the surface of a metal such as iron or aluminum is porcelain-enameled.

(3) The one in which on the surface or back of glass or transparent plastics plates there is coated a light reflective metal such as aluminum by a vacuum coating or silver by the silver mirror reaction, and, (4) The one in which on the surface of the above (1) or (3) there is disposed a transparent resin film.

However, the one in (1) needs polishing of the surface, in the buff polishing the finished surface being coarse and with the metallic surface alone, it is very difficult to obtain regular reflection property, and it has the disadvantage that in the electrolytic or chemical polishing, a wetting method is needed, there is not only the problem of environmental pollution of chemicals to be used but also the polished surface has no good regular reflective properties but is insufficient to form a light reflecting surface.

In reflectors (2), the surface subjected to porcelain-enameled treatment has no regular reflectivity, evenness being set aside, but can be obtained only random reflected light or dispersed light.

Reflectors (3) have a light-reflective metal surface and shows satisfactory regular reflective ability. However, they suffer from poor resistance to chemicals, weathering and abrasion. Plating with nickel, chromium or other metals shows poor total reflective ability. Being a wet process, plating also suffers from environmental pollution problems due to the chemicals used.

Reflectors (4) were intended to overcome the aforementioned disadvantages and show high regular reflectivity with a good protection of the light-reflective metal surface. However, the problems are the poor resistance of the coated resin film to abrasion, light, weathering and chemicals; resins with insufficient resistance will discolor or loose its transparency when they are used with the time and may cause scratches when wiped with a cloth or the like for cleaning. A thick coat of resin will result in increased temperature rise in the surface and deteriorated protective layer due to increased absorption of light and infrared rays.

In order to solve these problems, the inventers formerly proposed a vacuum-coated, light-transmittable inorganic protective film instead of the resin layer.

This method provides a thin replica inorganic layer exactly similar to the light reflective metallic coated film with a minimum of light refraction and reflection, thus minimizing the variation in total and regular reflectivity and refractivity. In addition, the protective layer thus obtained has excellent resistance to oils and abrasion, as well as good heat conductivity with a resultant less temperature rise and prolonged service life.

However, the light-transmittable resin film and inorganic film have respective advantages and disadvantages, and the reflectors formerly proposed by the present inventers were not successful for all requirements.

Further studies have led of the inventors to the findings that combined use of a transparent resin film and a light-transmittable inorganic film gives a surprising synergistic effect and they have excellent properties. The present invention has been accomplished based on such information.

Both metallic and nonmetallic substrates can be used in the present invention. Typical examples of metallic substrates are metals and alloys, such as iron, stainless steel, copper, brass, bronze, nickel, aluminum and duralumin; plated metal plates such as galvanized and tinned iron plates; and metal plates coated with a resin layer. As nonmetallic substrates may be mentioned, among others, various synthetic polymeric materials, glass, mica, ceramics, wood and paper. However, because of the need for vacuum coating of a light-reflective metal, materials containing water having a high vapor pressure under vacuum or low molecular weight substances cannot be used; In such a case they must be coated with resin. Examples of the synthetic polymeric resius used as the substrate in the present invention include epoxy resin, polyester resin, phenol resin, allyl resin, silicone resin, polycarbonate resin and urea resin. But they are not limitative. The resins to be coated on the substrate surface is preferably applied solvent-free, followed by thermal cure or baking. But coating with a solvent, electrostatic coating or film lamination may also be employed.

Light-reflective metals can be coated on the substrate surface by the vacuum metallization, sputtering, or ion plating process. Although somewhat different depending on the process used, metals that can be applied include aluminum, duralumin, silver, white gold, gold, nickel, chromium, indium, palladium, and vanadium. They are not limitative; for example, copper, when used in the air, tends to react with oxygen, carbon dioxide and moisture to loose its light reflectivity. But it can be applied successfully if coated with a protective layer. What should be noticed here is that, as illustrated in (2) and (4) in Table 1, when a resin releasing formaldehyde, such as phenol, melamine and urea resins, or a resin that may generated hydrogen chloride, such as polyvinylchloride and polyvinylidenechloride copolymers, is used as the fourth protective layer, a light-reflective metal that resists these corrosive gases must be selected. The fourth layer is the protective layer consisting of a vacuum-coated inorganic layer and/or a resin layer.

The first group of light-reflective inorganic substances to be vacuum-coated in the present invention include silicon oxide substances, such as quartz and rock crystal, and a family of glass, such as sodium glass, potassium glass, lead glass, borosilicate glass and aluminosilicate glass. These materials are crystalline or amorphous but generally form crystalline layers after vacuum coating. Another group of light-reflective inorganic substances is ceramic materials. These include oxide ceramics, such as alumina, magnesia, zirconia and spinel; idiolite ceramics such as cordierite; high alumina and mullite ceramics; zirconium ceramics and lithian ceramics such as pyroceram; steatite ceramics; titanium oxide ceramics; and celsian ceramics. These ceramics generally form crystalline layers after vacuum coating.

The light-reflective inorganic materials to be applied should be selected according to individual ervice requirements. Oxide ceramics, high alumina and mullite ceramics are preferably used when resistance to heat and acids are required. Ferroperidotite and ophiolite ceramics are suitable when resistance to alkalis is needed. It is preferable to use idiolite ceramics or lithian ceramics for high temperature use, and when extremely low thermal expansion and contraction are required, lithia ceramics such as pyroceram are preferably used.

The resins used for the protective layer in the present invention must be transparent, have no tendency of becoming translucent, and cause no corrosion on the metal layer. As examples of such resins may be mentioned, among others, transparent epoxy resin, polyester resin, melamine resin, silicone resin, acryl resin, polycarbonate resin, polyurethane resin and fluorocarbon resin. Of these, silicone resins, particularly high-aryl-content silicone resins, are most preferable for the purpose of the present invention because of their high thermal stability, high water repellency, resistance to low temperatures and chemicals, and excellent mechanical strength.

The high-aryl-content silicone resins herein referred to mean the heat-cured polyarylpolyalkylsiloxanes defined in our precedent application, Japanese Patent Application No. 038409 (1978), which have a ratio of aryl radical/(aryl radical+alkyl radical) ranging from 65 to 100 mole % and a carbon to silicon ratio ranging from 4.25 to 16 and contain 2 to 3 polymerizable functional groups per molecule. If the molar percentage of the aryl radicals mentioned above is less than 65, the heat resistance will be poorer. If the number of functional groups is out of the range specified above, coating of the resin will be difficult or sufficient curing of the coated resin will not be achieved after thermal polymerization.

In addition to the higher hardness, such silicone resins have the following advantages not found in the silicone resins conventionally used:

(1) The high aryl content not observed in conventional silicone resins (2) Higher thermal stability compared with the conventional silicone resins containing alkyl radicals alone or having a high alkyl content; serviceable at temperatures lower than 250° C. for long periods, and tolerable at temperatures between 250° and 600° C. if not exposed over a prolonged period; It also excellent resistance to light, weathering, chemicals and water (3) A sufficient adhesion to the substrates (4) Excellent characteristics for vacuum coating of light-reflective metals; unsurpassed in high-temperature vacuum coating, in particular (5) Very close to glass and quartz in refractive index; looks as if there were no overcoat (6) Colorless and light-transmittable coated film (7) Excellent flex resistance; little or no cracks and delamination by bending (8) Good workability; little or no environmental pollution problems Because of the outstanding properties as listed above, this type of silicone resin can be applied to high temperature uses and other new applications for which the conventional alkyl-radical rich silicone resins cannot be successfully employed.

The process for manufacturing the multi-layer coating reflectors of the present invention is described below.

The light-reflective metals can be vacuum-coated on the substrate surface by the vacuum metallizing, sputtering or ion plating process, as stated earlier.

Of these, the vacuum metallizing is the simplest method, but the energy that can be utilized for coating is only the kinetic energy of evaporated metal particles within the mean free path, i.e., 0.1 eV or less. Consequently, the penetration of the metal particles into the substrate is 1 Å or less, resulting in weak coating. The adhesion strength between the metal layer and the substrate is poor and the film density is low, with a consequent low peel strength.

The mean free path of evaporated metal particles increases with decreasing particle weight, increasing degree of vacuum, and rising temperature. Therefore, metals with lower atomic weight and smaller atomic diameter can be coated more easily. The degree of vacuum should be $10^{-4}$ Torr, preferably $10^{-5}$ Torr, or below. An alloy whose component metals form a molecular compound or whose component metals have similar mean free path and vaporization rate can be successfully coated by this method. If not, however, individual component metals are evaporated and coated separately, yielding nonuniform or weak film. In this case, the sputtering process in recommended.

In the sputtering process, excited metal particles having kinetic energy faster in speed than in the vacuum metallizing are allowed to strike onto the substrate surface and becoated on it. With the kinetic energy ranging from several 10 to several 100 electron volts, the metal particles penetrate into the substrate to a depth of from several Å to several 10 Å, producing stronger and more durable coating than in the vacuum metalizing process. And consequently, a coated film high and great in strength and dwability as compared with that in the method of vacuum coating is obtained and light reflection property of a light reflective coated film is considerably good also. As opposed to vacuum metallizing in which metal particles are generated from evaporation of a molten material, this process produces metal gases from a solid target through sublimation. This enables the sputtering process to be used for vacuum coating of alloys because dissociation into component metals is difficult to occur.

The problems associated with this process are the inconvenience that the coating materials must be shaped into a target with a special configuration, such as a disc form or cylinder and the lower production efficiency due to lower coating speed.

The ion plating process may be subdivided into several types. When a process of high coating efficiency is used, penetration of metal particles to a depth of several 100 Å is achieved with an energy of several KeV.

In contrast to the two vacuum coating processes described above, the ion plating employs cationic metal particles instead of neutral particles. The positively charged particles are forced to move toward a cathode, that is, the charged substrate, and strike it at a higher velocity than in the sputtering process. Since the cationic particles are smaller in size than the corresponding neutral particles, the mean free path is longer than in the vacuum coating and sputtering processes at the same temperature and pressure.

Typical ion plating processes are described below.

(1) Plasma ion plating

A voltage from several 100 to several 1000 volts is applied across the coating material and the substrate under a reduced pressure of $10^{-2}$ to $10^{-3}$ Torr to cause glow discharge, and the vaporized neutral metal particles are ionized in the resultant plasma and are hit against the substrate. This process features a high ionizing rate several 10% higher and the high mechanical strength of the film formed. Another advantage is the capability of coating also on the back face of the substrate because the metal particles move along the lines of electric force. However, the substrate must be thermally stable because of the short mean-free-path, and special means must be devised for coating of large substrates.

(2) RF ion plating

This process consists in coating a substrate with evaporated metal particles which have been ionized while passing through an RF oscillating coil. Coating is possible with a rather low degree of vacuum from $10^{-3}$ to $10^{-4}$ Torr with no excessive temperature rise in the cathode because the glow discharge is not required. These problems are the low ionizing rate and the failure to coat over a wide projected area because of the limited diameter of the RF oscillating coil used.

(3) Ion plating under voltage impression

This is a modified plasma ion plaing process in which a degree of vacuum ranging from $10^{-4}$ to $10^{-5}$ Toor is used. Although little or no glow is observed visually, the flow of cathode current is actually detected. Fairly good results are obtained at a degree of vacuum lower than $10^{-4}$ Torr and with a voltage gradient of several tens volts/cm or higher. This method provides effects intermediate between the plasma ion plating and the vacuum metallizing processes.

(4) Ionizing gun process

This process directly produces ionized metal particles by using an ionizing gun, as opposed to the three processes described above in which particles previously evaporated by resistance heating or electron beams are ionized by an electric field, plasma or high frequency waves.

Typical examples are the i-gun method and the hollow cathode method, both allowing coating in a high vacuum with a high ionizing efficiency.

Ion plating must be carried out giving full consideration to the features of individual processes mentioned above, or the coated light-reflective metal layers may discolor or become turbid, resulting in decreased reflectivity.

It is also essential to exclude reactive gases, such as air, from the system as far as possible to obtain satisfactory reflectivity, as otherwise the total reflectivity may fall or the light reflecting surface may become discolored or turbid.

The same equipment for vacuum coating the above light reflective metal may be employed to vacuum-coat inorganic substances. However, the operation methods differ to a considerable extent between the reflective metal and the inorganic substances.

The first point to be considered is the far greater energy required for melting, sublimating or evaporating inorganic substances than that required for light-reflective metals. Whatever processes may be used, the coating time will be longer and the methods for evaporation and inonization will be limited. For example, most of the light-reflective metals can be melted and evaporated by resistance heating using a high melting-point metal, whereas most of the inorganic substances must be evaporated by means of electron beams or ion beams.

The second point is the fact that most inorganic substances melt only at the heated part and its neighboring section, as opposed to metals which can be uniformly heated and melted because of the good heat conductivity.

All the inorganic substances used in the present invention have structure of a compound; this also requires attention. Take silicon dioxide for example. When heated with an electron gun, this compound dissociates into silicon, silicon monoxide, oxygen etc., though only slightly. The oxygen is light in weight and apt to be excluded from the vacuum system, resulting in the formation of a vacuum coates protective coating deficient in oxygen. When exposed to the air, such an oxygen-deficient film will form a water-soluble siliceous substance, which may cause loss of transparency and turbidity. The present inventors succeeded in overcoming this difficulty by supplying enough oxygen in the coating system or by subjecting the coated film to the reaction coating in the presence of oxygen. Another typical example is the vacuum coating of alumina, in which yellow or, even dark brown, coatings are usually formed. However, colorless and transparent alumina film can be vacuum-coated by using the methods described above. The mean free path of inorganic substances is shorter in most cases than that of light-reflective metals. Hence, severer operating conditions, such as higher degree of vacuum, higher temperature, higher inonization rate, etc., are required for inorganic substances. For example, aluminum can be vacuum-coated at a pressure on the order of $10^{-4}$ Torr, whereas a pressure on the order of $10^{-5}$ Torr is required to achieve satisfactory results with silicon dioxide. In the sputtering process, coating speed is far lower in inorganic substances than in light-reflective metals. In the ion plating processes, on the other hand, problems are the difficulty of ionization and the fact that since the coated film, i.e., the cathode, is an insulator, further ion plating proceeds with extreme difficulty. This is especially marked with the plasma ion plating in which the cathode potential is high and ion current is large.

In such cases, considerable improvements are achieved by installing a separate metal-net cathode in the vicinity of the cathode, instead of using the coated film as the cathode. The plasma ion plating should be carried out in a degree of vacuum between $10^{-3}$ Torr and 1 Torr, preferably on the order of a degree of reduced pressure of $10^{-2}$ Torr, while maintaining the impressed voltage at a level larger than the ionization voltage and less than about 10 KV. A higher degree of vacuum may lead to the failure to conduct glow discharge or the disappearance of the dark space; with a lower degree of vacuum, on the other hand, an arc discharge or spark discharge may result. When an ion generator is used, as the RF ion plating, RF ion gun, and hollow cathode processes, coating is possible in some cases at pressure up to $10^{-4}$ Torr. One of the advantages of the ion plating process is the fact that the mean free path is longer than in the vacuum metallizing if the ionization rate is sufficiently high and that the mean free path is further lengthened with increasing impressed voltage, thus allowing vacuum coating at decreased degree of vacuum. However, the ionization voltage is higher and the mean free path is shorter in inorganic substances; hence, it is preferable to apply the plasma ion plating at as high an excitation voltage as possible, or to use a hollow cathode or RF ion gun. In these cases, however, if dissimilar materials with significantly different mean free paths and ion speeds are present, the coated film may be discolored uneven or lack in transparency; hence, it is preferable to use materials as pure as possible. It is also preferable to carry out ion plating in the oxygen atmosphere to prevent formation of oxygen-deficient film. This requirement is opposite to that in the vacuum coating of light-reflective metals of the third layer mentioned before, in which oxygen or air must be exluded from the system.

In the manufacture of the reflectors of the present invention, the same vacuum coater can be employed for the light-reflective metal and inorganic substance. Therefore, it is preferable to vacuum-coat these two types of materials successively for convenience of operation. However, the choice between the resin layer and the inorganic layer as the top coat should be determined by individual application requirements.

The thus obtained relfectors show their excellent durability immediately after the manufacture. But, a longer service life can be generally ensured after aging, for example by: (1) leaving them several days at room temperature, (2) heating at a temperature lower than the heat distortion temperature for several to several tens of hours, or (3) repeating cycles of heating at a temperature lower than the heat distortion temperature followed by cooling several times.

The characteristic features of the reflectors of the present invention are listed below.

(1) Much higher regular reflectivity can be achieved by coating resin on the substrate.

(2) Lamination of a light-transmittable inorganic coated layer and a resin layer used as a protective film layer makes it possible to reduce the thickness of individual layers as compared with when one of the two layers is applied individually.

(3) Both the protective film can be resin firmly bonded and the inorganic layer is reinforced by the resin layer, eliminating brittleness encountered when only the inorganic layer is coated, and impact resistance is strengthened.

(4) The smaller thickness of both the inorganic and resin layers assures higher regular reflectivity, producing very clear reflected images or providing light collective of light distributing properties with high accuracy.

(5) The protective layer consisting of an inorganic layer and a resinous layer requires a smaller thickness compared with the case where the light-transmittable resin layer is used alone, resulting in higher heat transfer and less temperature rise. This assures the reflectors a longer service life.

(6) When the inorganic layer forms the outermost layer, it covers up the disadvantages of the inner resin layer, such as poor resistance to oil, solvents, light, heat and abrasion. On the other hand, if a resin layer is used as the top coat, it covers up the disadvantages of the inner inorganic layer, such as brittleness, poor resistance to water, moisture and chemicals.

The advantages of the reflectors listed in Table 1 are detailed below. Reflectors 1 and 3 in Table 1, both having a light-transmittable inorganic layer vacuum-coated on a vacuum-coated light-reflective metal layer, can be manufactured efficiently by conducting the two kinds of vacuum coating successively and continuously without taking out the intermediate product from the vacuum coater. Although less resistant to oil and solvents and poorer in surface hardness because of the resin top layer, they are more flexible and have higher resistance to chemicals, water and moisture. Reflectors 3 and 4 in Table 1 are both provided with a resin layer on the substrate, on which a light-reflective metal layer is vacuum-coated, featuring higher regular reflectivity. Reflectors 2 and 4 both comprise a vacuum-coated, light-reflective metal layer, a transparent resinous layer coated thereon, and a transparent inorganic layer vacuum-coated on said resin layer. Hence, it is impossible to carry out the two kinds of vacuum coating successively and continuously, and the production efficiency will be much the lower. The advantages of these types of reflectors, on the other hand, are superb resistance to solvents because the outer most layer is a light transmittable inorganic layer as compared with a light-transmittable resin layer. Extra care must be exercized in these cases to these cases to prevent volatile unreacted monomers and residual solvents from remaining as much as possible in conducting vacuum coating on resin.

The layers mentioned in this invention, even if they are multipayers, if they are the same kind, are regarded as one layer. For example, a layer consisting of aluminum alone and that consisting of copper and aluminum are both considered as one layer. Similarly, a light-transmittable inorganic layer consisting of silicon dioxide and alumina is defined as one layer. The same applies to the light-transmittable resin layer.

EXAMPLE 1

A bright-finish aluminum sheet of the size 0.1 cm×40 cm×40 cm was placed in a bell jar in the vacuum coater and held 42 cm directly above the hearth liner in parallell position. After evacuating to $3 \times 10^{-5}$ Torr, aluminum was evaporated by electron beams in the presence of oxygen, and vacuum coating was conducted for 30 seconds at an impression voltage of $-3$ KV, an EB output power of 2 KW, and a coating pressure of 4 to $6 \times 10^{-5}$ Torr, as shown in 1 in Table 2. The substrate temperature was maintained at room temperature.

The vacuum-coated substrate was then submitted to the next vacuum coating without being taken out of the bell jar. After adjusting the degree of vacuum to $3 \times 10^{-5}$ Torr, pyroceram was evaporated by electron beams in the presence of oxygen, and vacuum coating was carried out for five minutes at an impression voltage of $-0.7$ KV, an EB output power of 0.6 KW and a coating pressure of 6 to $8 \times 10^{-5}$ Torr, as shown in 1 in Table 2. The substrate temperature was maintained at room temperature.

The three-layer reflector thus obtained was taken out of the vacuum coater, and a high aryl-content silicone resin, having a phenyl radical/(phenyl radical+methyl radical) ratio of 83.6 mole %, Was coated and heat-cured, giving a four-layer reflector.

The reflector thus prepared was installed to a 400 W square lamp and maintained at 180° C. for 24 hours. No change was observed in the reflectivity and appearance, such as discoloration and cracks. The reflector also showed no change when allowed to stand in rainwater for five days. Especially, the result of the Scotch tape test was 100/100, indicating its excellent adhesion. As compared with conventional reflectors in which anhydrous silicie acid is coated by the wet process on an anodized or chemically polished aluminum, this reflector showed a slightly better total reflectivity. However, the regular reflectivity was quite excellent, making this reflector suitable for use in aircraft exterior lighting fixtures.

EXAMPLE 2

A glass plate measuring 0.1 cm×10 cm×10 cm was used as the substrate after through degreasing, cleaning and drying. It was held at 7 cm above an RF oscillating coil, 10 cm in diameter and 10 cm in height, which was installed at 8 cm directly above a hearth liner in a vacuum coater. After adjusting the degree of vacuum in the bell jar to $2\times10^{-5}$ Torr, argon gas was introduced to a pressure of $5\times10^{-3}$ Torr, followed by evacuation to a degree of vacuum of $2\times10^{-5}$ Torr again. This operation was repeated once again. Aluminum was evaporated by electron beams at an RF output power of 500 W and a 13.56 MHz frequency, and vacuum coating was conducted for 30 seconds at an impression voltage of −1 KV and EB output power of 1.5 to 2.0 KW, as shown in 2 in Table 2. The substrate was maintained at room temperature.

The argon partial pressure in the bell jar was than adjusted to 4 to $5\times10^{-4}$ Torr, and silicon dioxide was vacuum-coated for four minutes at an impression voltage of −0.15 KV and an electron beam output power of 0.6 KW.

On the silicon oxide protective coating thus obtained was applied a thermosetting polyester resin solution, which was cured by heating. Pieces of the reflector thus prepared were immersed in 10% aqueous sulfuric acid or hydrochloric acid for 30 minutes, and in city water for three days. No change was observed in all pieces, indicating excellent resistance to acids and water. This reflector is suitable as interior lighting reflectors used in moist conditions.

EXAMPLE 3

A polycarbonate sheet measuring 0.1 cm×10 cm×10 cm, designed for automobile rear-vision mirrors and interior mirrors, was used as the substrate. It was placed in a vacuum-coater bell jar and held 30 cm directly above the hearth liner in parallel position. After adjusting the pressure in the jar to $3\times10^{-5}$ Torr, aluminum was evaporated by electron beams in the presence of air and vacuum coating was carried out for 30 seconds at an impression voltage of −3 KV, an EB output power of 2 KW and a coating pressure of 6 to $7\times10^{-5}$ Torr, as shown in 3 in Table 2. The substrate was maintained at room temperature. The vacuum-coated substrate was taken out of the bell jar, and the aluminum surface was coated with a high aryl-content silicone resin having a phenyl radical/(phenyl radical+methyl radical) ratio of 83.6 mole %, which was cured by heating. This piece was again put into the bell jar and held at the same position as above. After evacuating to a pressure of $10^{-5}$ Torr, silicon dioxide was vacuum-coated at an impression voltage of −0.6 KV, coating pressure of 5 to $7\times10^{-5}$ Torr and electron beam output power of 0.5 KW, as shown in 3 in Table 2. The substrate was maintained at room temperature.

The reflector obtained is lighter than conventional back-surface coated glass mirrors and was not broken when dropped from a 2 m height. When it was broken forcibly, there was observed no scattering of small broken fragments as in glass mirrors, demonstrating its high safety. This is suitable for use as automobile rear view mirrors and interior mirrors.

EXAMPLE 4

A stainles steel sheet 0.12 cm thick was pressed into a form of a projector reflector 34 cm and 14.5 cm in diameters. After buffing, degreasing and cleaning of the internal surface, it was held by the substrate holder in a sputtering apparatus. A coaxial magnetron sputter electrode was used as the cylindrical aluminum target, which was fixed at a position 4.7 cm apart from the nearest section of the substrate and 14.5 cm from the farthest section. After evacuation of the bell jar to $2.5\times10^{-6}$ Torr, argon gas was introduced to a pressure of $1\times10^{-3}$ Torr. With the shutter closed, cleaning sputtering was conducted for ten minutes at an output power of 4.5 KW and a frequency of 13.56 MHz to clean the target surface and stabilize the discharge. After that, the shutter was opened and aluminum was sputtered for five minutes.

The reflector thus obtained was taken out of the bell jar, and a high aryl-content silicone resin having a phenyl radical/(phenyl radical+methyl radical) ratio of 83.6 mole % was coated and heat-cured. The coated substrate was again set to the same position in the bell jar as above. The temperature in the bell jar was raised to 200° C. by using a cylindrical silicon dioxide target, cleaning sputtering was conducted for ten minutes in the same manner as above, and silicon dioxide was sputtered for 60 minutes.

The four-layer reflector thus prepared was free from scratches when its surface was strongly rubbed with a piece of gauze, and showed no delamination by the Scotch tape test. No change was observed when left in an oven held at 180° C. or exposed to an atmosphere of 90% relative humidity for three days at room temperature. It was not attacked by organic solvents such as petroleum ether, ketones and hexane, showed excellent adhesion and resistance to abrasion, heat, moisture and chemicals, and is best suited as the shade for reflectors used in ships.

EXAMPLES 5 AND 6

In Example 5, a stainless steel sheet 0.12 cm thick was pressed into a form of a shade used for a 400 W reflector, 42 cm in diameter and 21 cm height, then buffed, degreased, cleaned and dried. A high aryl-content silicone resin having a phenyl radical/(phenyl radical+methyl radical) ratio of 83.6 mole % was coated and heat-cured. In Example 6, a synthetic mica sheet measuring 0.2 cm×10 cm×10 cm was used as the substrate, on which a phenol resin was coated and heat-cured. Each substrate was put into a vacuum-coater bell jar and held directly above the hearth liner in parallel position. The distance between the bottom of the substrate and the hearth liner was 20 cm in Example 5, and 30 cm in Example 6. After evacuating the bell jar to a pressure of $2\times10^{-5}$ Torr, aluminum was heated by electron beams vacuum-coated in the presence of air for 30 seconds at an impression voltage of −3 KV and EB output power of 2 KW. The coating pressure was 4 to $6\times10^{-5}$ Torr and 5 to $7\times10^{-5}$ Torr respectively, as shown in 5 and 6 in Table 2. After adjusting the degree of vacuum in the bell jar to $1\times10^{-5}$ Torr, oxygen was introduced to a pressure of $5\times10^{-3}$ Torr followed by evacuation to $1\times10^{-5}$ Torr. This operation was repeated once again. In Example 5, mullite was evaporated by electron beams and vacuum-coated on the aluminum surface in the presence of oxygen at an EB Output of 1 KW; in Example 6, silicon dioxide was vacuum-coated in the same manner at an EB output power of 0.5 KW. The impression voltage was −0.7 KV and the coating pressure was 7 to $9\times10^{-5}$ Torr in both cases as shown in 5 and 6 in Table 2.

The transparent mullite protective layer obtained in Example 5 was coated with a high aryl-content silicone resin having a phenyl radical/(phenyl radical+methyl radical) ratio of 83.6 mole % followed by heat curing, while the transparent silicon dioxide protective layer obtained in Example 6 was coated with a melamine resin, which was also heat-cured. The five-layer reflectors thus prepared showed no change after immersion in city water for three days. Droplets of 10% aqueous sulfuric acid, hydrochloric acid and caustic soda solution placed on the surface also caused no change after 30 minutes. They were not attacked by alcohols, petroleum ether, esters and other organic solvents, water, and other chemicals. The high aryl-content silicone resin, in particular, has an exceedingly high resistance to chemicals and solvents compared with common resins. Lighting fixtures conventionally used in chemical plants are those, in order to minimize corrosion by chemicals, in which an electrolytically polished aluminum sheet is incorporated in a stainless steel body, but they still suffer from corrosion on the light-reflective aluminum surface. Reflectors having similar characteristics to those in Example 5 are best suited for this purpose because of the superb resistance to corrosion. In addition, the reflectors of the present invention can be manufactured by the direct vacuum coating of a light-reflective metal layer, which eliminates the need for incorporation of a mirror into the reflector body, resulting in higher weight and reduced cost. The reflector of Example 6, comprising a synthetic resin substrate and a flame retardant melamine protective layer, is higher in weight, difficult to break, and free from scattering of small fragments if broken. This makes it promising as flame retardant interior mirrors, ceiling mirrors and decorative interior materials.

EXAMPLE 7

An aluminum sheet 0.16 cm thick was subjected to spinning to form a parabolic form 20 cm in height and 40 cm in maximum diameter. It was buffed, degreased, cleaned, dried and coated with a high aryl-content silicone resin having a phenyl radical/(phenyl radical+-methyl radical) ratio of 83.6 mole %, followed by heat curing. It was then put into a vacuum-coater bell jar and held 20 cm directly above the hearth liner in parallel position. After evacuating the bell jar to $3\times10^{-5}\times10^{-5}$ Torr, aluminum was heated by electron beams and vacuum coating was carried out for 30 seconds in the presence of air at an impression voltage of 3 KV, an EB output power of 1.5 to 2 KW and a coating pressure of 5 to $7\times10^{-5}$ Torr. The substrate was maintained at room temperature. The vacuum-coated piece was taken out of the bell jar, and coated again with the same high aryl-content silicone resin followed by heat curing. It was put into the bell jar and held at the same position as above. After evacuation to $3\times10^{-5}$ Torr, oxygen was introduced to a pressure of $5\times10^{-5}$ Torr followed by evacuation to $3\times10^{-5}$ Torr. This operation was repeated once again, and alumina was heated b— electron beams in the presence of exygen and vacuum-coated for five minutes at an impression voltage of $-0.5$ KV, EB output power of 0.5 KW and coating pressure of 8 to $12\times10^{-5}$ Torr, as shown in 7 in Table 2.

The reflector thus obtained, as compared with conventional ones, such as anodized aluminum or chemically polished aluminum coated with anhydrous silicic acid by the wet process, showed slightly better total reflectivity. However, the specular reflectivity was exceedingly higher. Use of this type of reflector allows easier light collection design, achieving accurate light patterns as designed. The adhesion was also excellent, as evidenced by the result of the Scotch tape test, 100/100. No change was observed after immersion in city water for five days. Droplets of 10% aqueous sulfuric acid placed on the light-reflective surface caused no change on the surface after 30 minutes. These characteristics make it ideal for the reflectors installed in chemical plants and other corrosive conditions.

EXAMPLE 8

A high-density alumina ceramics sheet formed and sintered to a size of 0.3 cm $\times$ 15 cm $\times$ 15 cm was coated with a high aryl-content silicone resin having a phenyl radical/(phenyl radical+methyl radical) ratio of 83.6 mole % followed by heat curing. The coated substrate was put into a vacuum-coater bell jar and held 25 cm directly above the hearth liner in parallel position. After evacuation to $2\times10^{-5}$ Torr, nitrogen gas was introduced to a pressure of $3\times10^{-3}$ Torr followed by evacuation to $2\times10^{-5}$ Torr. This operation was repeated once again. Glow discharge was initiated at an impression voltage of $-1$ KV, EB output power of 1.5 KW and coating pressure of 3 to $4\times10^{-3}$ Torr as shown in 8 in Table 2, under which condition metallic titanium was heated by electron beams and vacuum-coated for five minutes.

The golden titanium nitride reflector thus prepared was taken out of the bell jar and coated with the same high aryl-content silicone resin as above followed by heat curing. This was again put into the bell jar and held at the same position as above. After evacuation to $1\times10^{-5}$ Torr, pyrex glass was evaporated by electron beams and vacuum coating was conducted for five minutes at an impression voltage of $-0.7$ KV, EB output power of 0.5 KW and coating pressure of 4 to $6\times10^{-5}$ Torr, as shown in the table. The ubstrate was maintained at room temperature.

The five-layer reflector thus prepared showed no change when placed in an oven maintained at 180° C., caused no scratches when rubbed with a piece of gauze, and was not attacked by common organic solvents such as alcohols, acetone and petroleum ether. Resistance to heat, abrasion and chemicals was also excellent. It has a beautiful gold-like appearance and difficult to contaminate. Such features make this type of reflector suitable as interior goods, such as ornaments, ashtray sets and interior materials.

The accompanying table 1 lists the embodiments of the present invention. Table 2 tabulates processing conditions in each embodiment.

TABLE 1

| Layer No. | | Multi-layer Reflectors of the Present Invention | | | | |
|---|---|---|---|---|---|---|
| | | | 4-Layers | | 5-Layers | |
| | | Material | 1 | 2 | 3 | 4 |
| 5 | Second protective layer | Resin | O | | O | |
| | | Inorganic substance (vacuum coating) | | O | | O |
| 4 | First protective layer | Resin | | | O | O |
| | | Inorganic substance (vacuum coated) | | O | O | |
| 3 | Metal layer | Metal (vacuum coated) | O | O | O | O |
| 2 | Resin | Resin | | | O | O |

TABLE 1-continued

| | | Multi-layer Reflectors of the Present Invention | | | |
|---|---|---|---|---|---|
| Layer No. | Material | 4-Layers 1 | 2 | 5-Layers 3 | 4 |
| 1 | layer Substrate Nonmetallic substance or Metal | O | O | O | O |

TABLE 2

| layer No. | materials | Pricessing conditions of Multi-layer Reflectors of the Present Invention 4 layers | | | | 5 layers | | | |
|---|---|---|---|---|---|---|---|---|---|
| | | 1 | 2 | 3 | 4 | 5 | 6 | 7 | 8 |
| 5 second protective layer | resin | high aryl silicone resin | polyester | | | high aryl silicone resin | melamin | | |
| | inorganics | | | silicon oxide | silicon oxide | | | alumina | pyrex |
| | atomosphere | | | air | argon | | | oxygen | air |
| | applied voltage | | | −0.6 KV | | | | −0.5 KV | −0.7 KV |
| | E.B out put | | | 0.5 KW | | | | 0.5 KW | 0.5 KW |
| | coating pressure, (Torr) | | | 5~7×10⁻⁵ | 1×10⁻³ | | | 8~12×10⁻⁵ | 4~6×10⁻⁵ |
| | time (minutes) | | | 5 | 60 | | | 5 | 5 |
| 4 first protective layer | resin | | | | | | | high aryl silicone resin | high aryl silicone resin |
| | inorganics | pyroceram | silicon oxide | | | mullite | solicon oxide | | |
| | atomosphere | air | argon | | | oxygen | oxygen | | |
| | applied voltage | −0.7 KV | −0.15 KV | | | −0.7 KV | −0.7 KV | | |
| | E.B out put | 0.6 KW | 0.5 KW | | | 1.0 KW | 0.5 KW | | |
| | coating pressure, (Torr) | 6~8×10⁻⁵ | 4~5×10⁻⁴ | | | 7~9×10⁻⁵ | 7~9×10⁻⁵ | | |
| | time (minutes) | 5 | 6 | | | 5 | 5 | | |
| 3 metal | light reflactive metal | Al | Al | Al | Al | Al | Al | Al | Al |
| | atomosphere | air | argon | air | argon | air | air | air | N |
| | applied voltage | −3.0 KV | −1 KV | −3.0 KV | | −3 KV | −3 KV | −3 KV | −1 KV |
| | E.B out put | 2 KW | 1.5~2 KW | 2 KW | | 2 KW | 2 KW | 1.5~2 KW | |
| | coating pressure (Torr) | 4~6×10⁻⁵ | 1~2×10⁻⁴ | 6~7×10⁻⁵ | 1×10⁻³ | 4~6×10⁻⁵ | 5~7×10⁻⁵ | 5~7×10⁻⁵ | 3~4×10⁻³ |
| | time | 30 sec. | 30 sec. | 30 sec. | 5 min. | 30 sec. | 30 sec. | 30 sec. | 5 min. |
| 2 resin layer | resin | | | | | high aryl silicon resin | phenol resin | high aryl silicone resin | high aryl silicone resin |
| 1 substrate | nonmetal | Al | glass plate | poly carbonate resin | | synthetic mica | Al | alumina ceramics | |
| | metal | | | | stainless supttering method | | | | |
| | | applied voltage method | R.F | applied voltage | | applied Voltage | applied Voltage | applied Voltage | Ti-reaction coating Pyrex, applied Voltage |

What we claim are:

1. A multi-layer coated reflector which comprises a substrate capable of withstanding a vacuum-deposition operation with a flex resistant thermosetting resin layer capable of withstanding a vacuum-deposition operation coated thereon, a light-reflective metal vacuum-deposited on said substrate, and two protective layers consisting of a vacuum-deposited, light-transmittable inorganic compound layer and a light-transmittable flex resistant thermosetting resin layer coated on said metal layer.

2. A multi-layer coated reflector as set forth in claim 1, wherein said reflector comprises a substrate with a resin coated thereon, a light-reflective metal vacuum-deposited on said substrate, a light transmittable inorganic compound vacuum-deposited on said metal layer, and a light-transmittable resin coated on said inorganic compound layer.

3. A multi-layer coated reflector as set forth in claim 1, wherein said reflector comprises a substrate with a resin coated thereon, a light-reflective metal layer vacuum deposited on said substrate, a resin layer coated on said metal layer, and a light transmittable inorganic compound vacuum-coated on said resin layer.

4. A multi-layer coated reflector as set forth in claim 3, wherein at least one of said resin layer coated on said substrate or said resin layer coated on said metal layer is a cured high aryl-content silicone resin of aryl radical/-

(aryl radical+alkyl radical) mole % ranging from 65% to 100%.

5. A multi-layer coated reflector as set forth in claim 4, wherein said resin layer coated on said substrate or said resin layer coated on said metal layer is a cured polyarylalkylsiloxane resin having an aryl radical/(aryl radical+alkyl radical) mole % ranging from 65% to 100%, a ratio of carbon atoms to silicon atoms ranging from 4.25 to 16 and containing 2 to 3 polycondensable functional groups.

6. A multi-layer coated reflector which comprises a substrate capable of withstanding a vacuum-deposition operation, a light-reflective metal vaccum-deposited directly on said substrate, and two protective layers consisting of a vacuum-deposited, light-transmittable inorganic compound layer and a light-transmittable flex resistant thermosetting resin layer coated on said metal layer.

7. A multi-layer coated reflector as set forth in claim 6, wherein said reflector comprises a substrate, a light-reflective metal layer vacuum-deposited thereon, a light transmittable inorganic compound vacuum-deposited on said metal layer, and a light transmittable resin layer coated on said inorganic compound layer.

8. A multi-layer coated reflector as set forth in claim 6, wherein said reflector comprises a substrate, a light-reflective metal vacuum-deposited thereon, a light transmittable resin coated on said metal layer, and a light transmittable inorganic compound vacuum-deposited on said resin layer.

9. A multi-layer deposited reflector as set forth in claims 1, 6, 8, 2 or 3, wherein said light transmittable inorganic substance is an amorphous glass containing silicon dioxide.

10. A multi-layer coated reflector as set forth in claims 1, 6, 8, 2 or 3, wherein said light-transmittable inorganic compound is a ceramic.

* * * * *